No. 758,514. PATENTED APR. 26, 1904.
J. B. EHRLICH.
COMBINATION LATHE.
APPLICATION FILED MAR. 12, 1903.
NO MODEL. 7 SHEETS—SHEET 1.

WITNESSES:
L. B. Shafer
C. C. Topp

INVENTOR.
John B. Ehrlich,
BY
F. W. Koerner,
ATTORNEY.

No. 758,514. PATENTED APR. 26, 1904.
J. B. EHRLICH.
COMBINATION LATHE.
APPLICATION FILED MAR. 12, 1903.
NO MODEL. 7 SHEETS—SHEET 3.

WITNESSES:
L. B. Shafer
C. C. Topp

INVENTOR.
John B. Ehrlich,
BY
F. W. Woerner,
ATTORNEY.

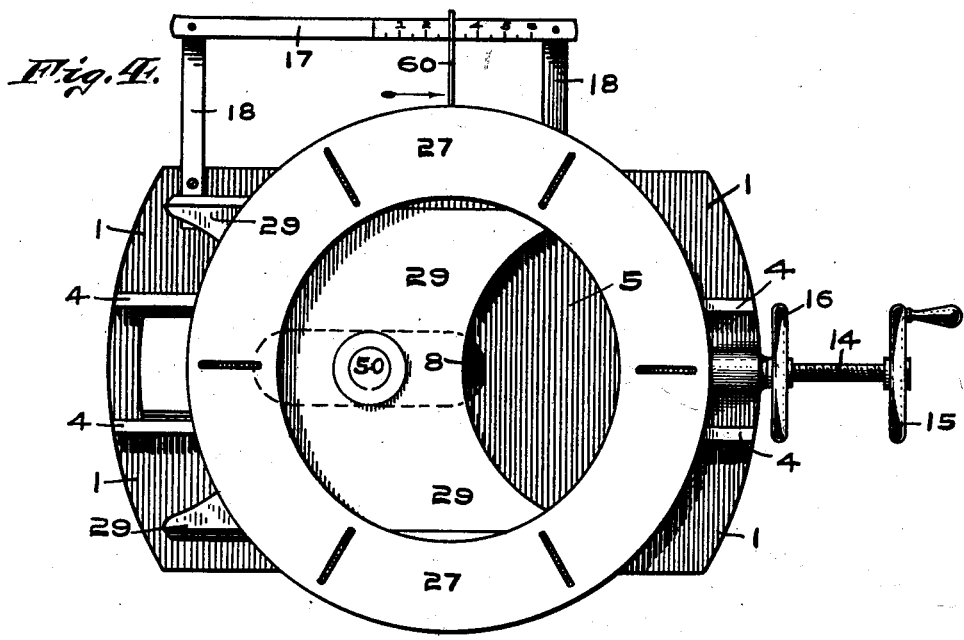
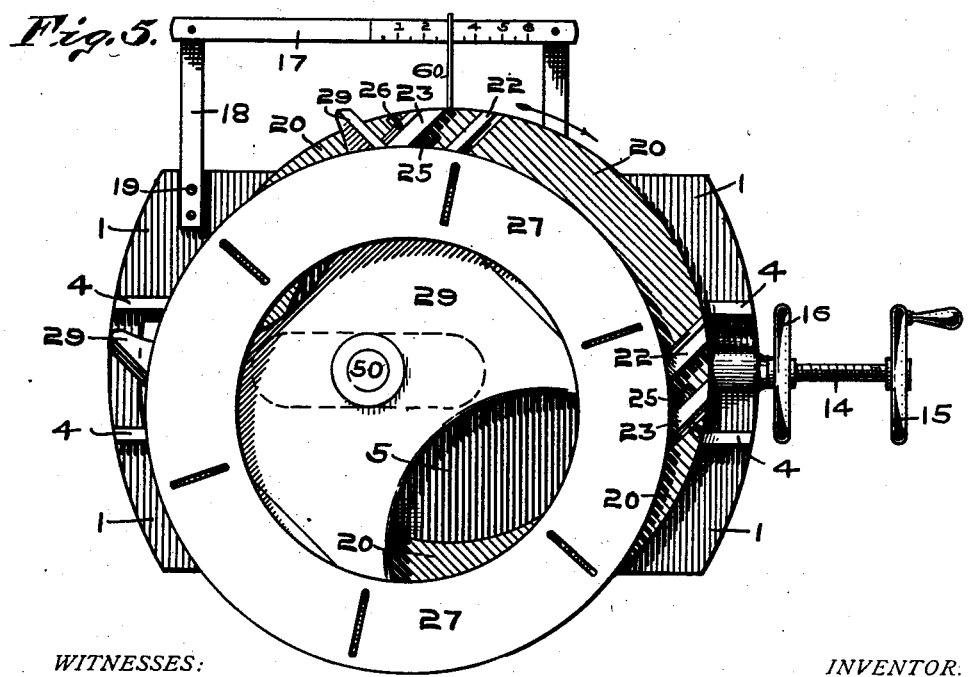

No. 758,514. PATENTED APR. 26, 1904.
J. B. EHRLICH.
COMBINATION LATHE.
APPLICATION FILED MAR. 12, 1903.
NO MODEL. 7 SHEETS—SHEET 5.
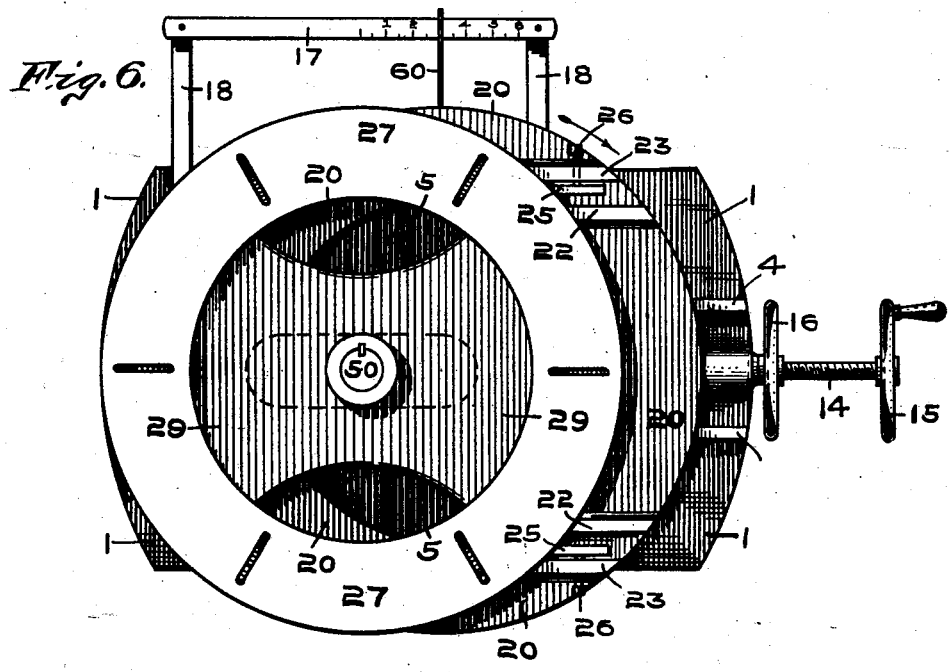
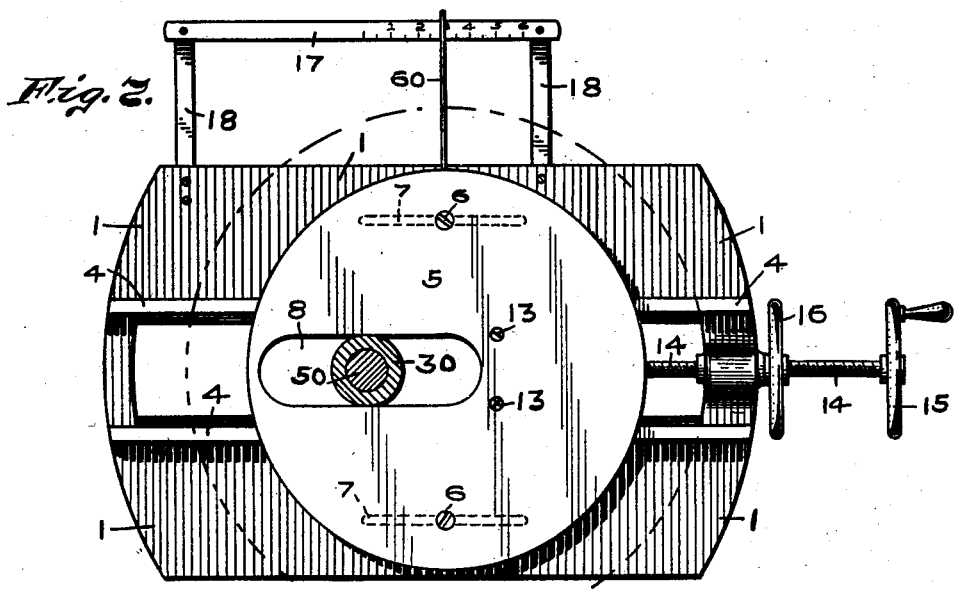
WITNESSES:
L. B. Shafer
C. C. Topp
INVENTOR
John B. Ehrlich,
BY
F. W. Woerner,
ATTORNEY.

No. 758,514. PATENTED APR. 26, 1904.
J. B. EHRLICH.
COMBINATION LATHE.
APPLICATION FILED MAR. 12, 1903.
NO MODEL. 7 SHEETS—SHEET 6.
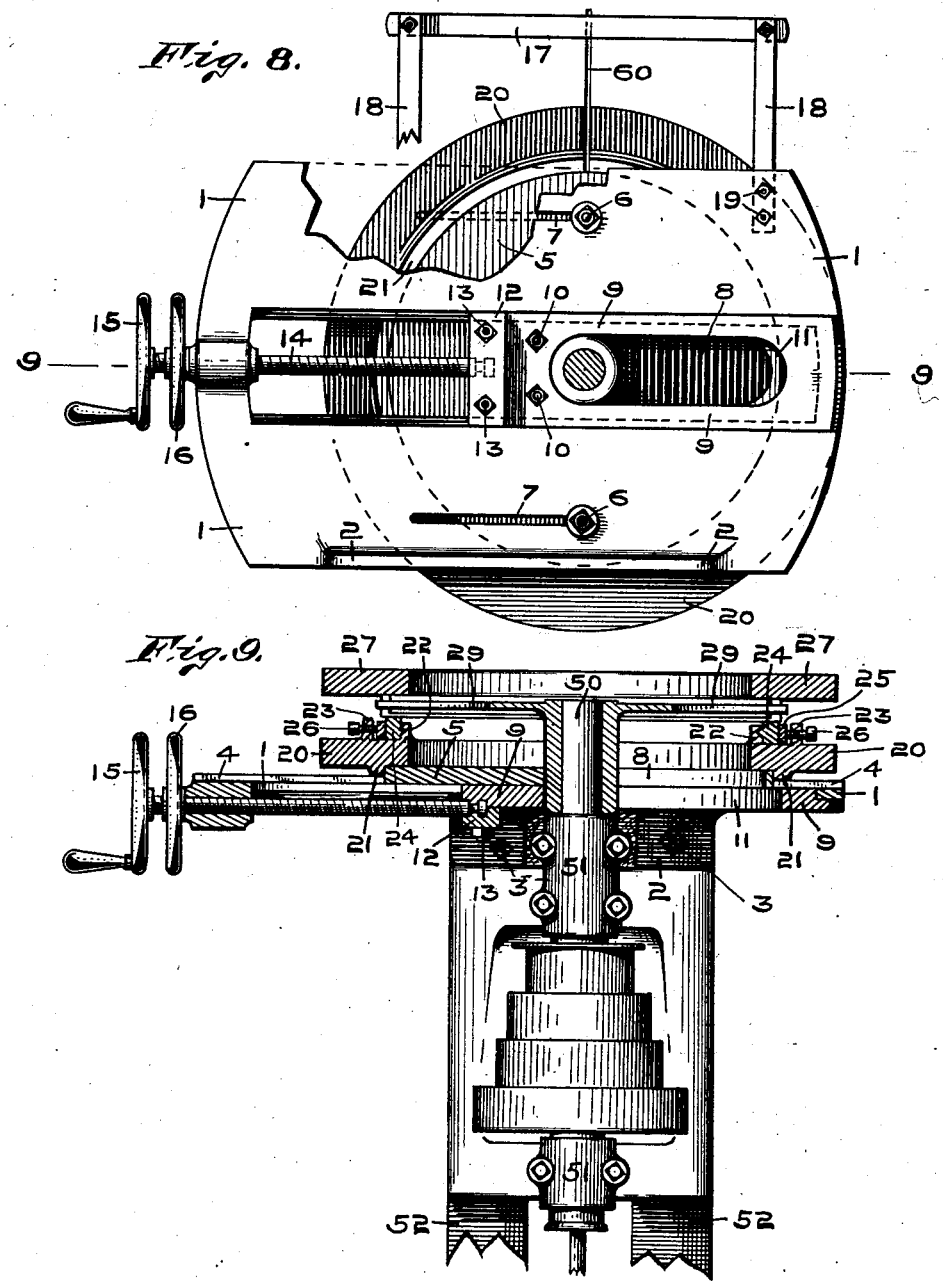
WITNESSES:
L. B. Shafer
C. C. Topp
INVENTOR.
John B. Ehrlich,
BY
F. W. Koerner,
ATTORNEY.

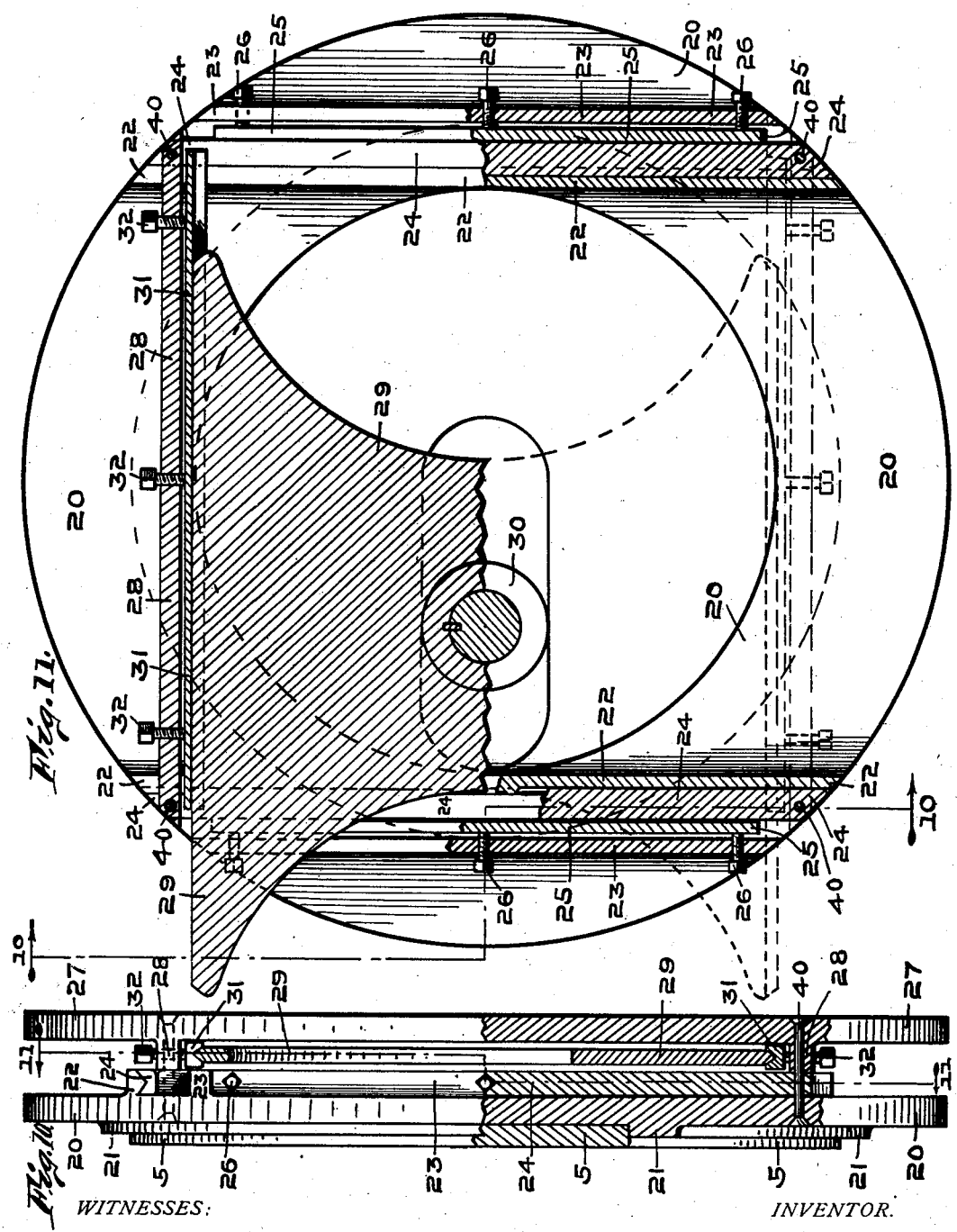

No. 758,514. Patented April 26, 1904.

UNITED STATES PATENT OFFICE.

JOHN B. EHRLICH, OF INDIANAPOLIS, INDIANA.

COMBINATION-LATHE.

SPECIFICATION forming part of Letters Patent No. 758,514, dated April 26, 1904.

Application filed March 12, 1903. Serial No. 147,429. (No model.)

*To all whom it may concern:*

Be it known that I, JOHN B. EHRLICH, a citizen of the United States, residing at Indianapolis, in the county of Marion and State of Indiana, have invented certain new and useful Improvements in Combination-Lathes, of which the following is a specification.

This invention relates to combination-lathes, and has for its object a means whereby a lathe can be so arranged as to produce both circular and elliptic work.

The object consists, further, in a device that can be readily attached to any ordinary lathe-frame and which will be compact, neat in appearance, and one in which none of the rotary parts extend beyond the greatest radius of eccentricity. Such a construction reduces the liability of injury to the operator over the elliptic lathes of other constructions having some of the parts of the elliptic rotary mechanism extending beyond the circular rotating mechanism. It will be understood that to produce elliptic work the rotating rings must have eccentric movement. A movement that naturally changes its course, causing the mechanism to travel out of a true circle, will bear strict surveillance, thus diverging the operator's mind from his work.

The object consists, further, in a device on which circular work can be produced and can be instantly, precisely, and effectually converted, so as to produce elliptic work. There are other features, the construction of which will be hereinafter more particularly described and then pointed out in the claims.

Figure 1:
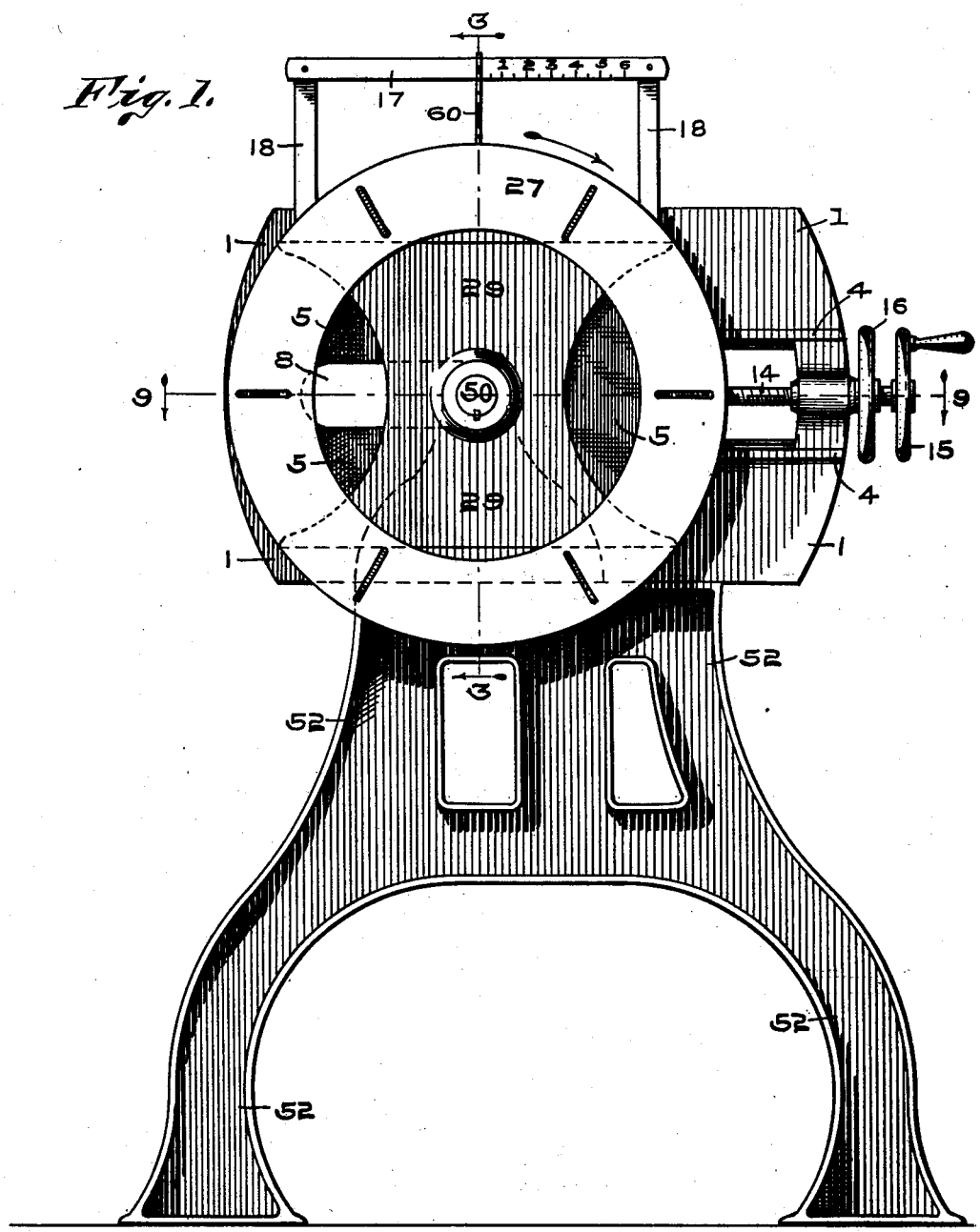
Figure 2:
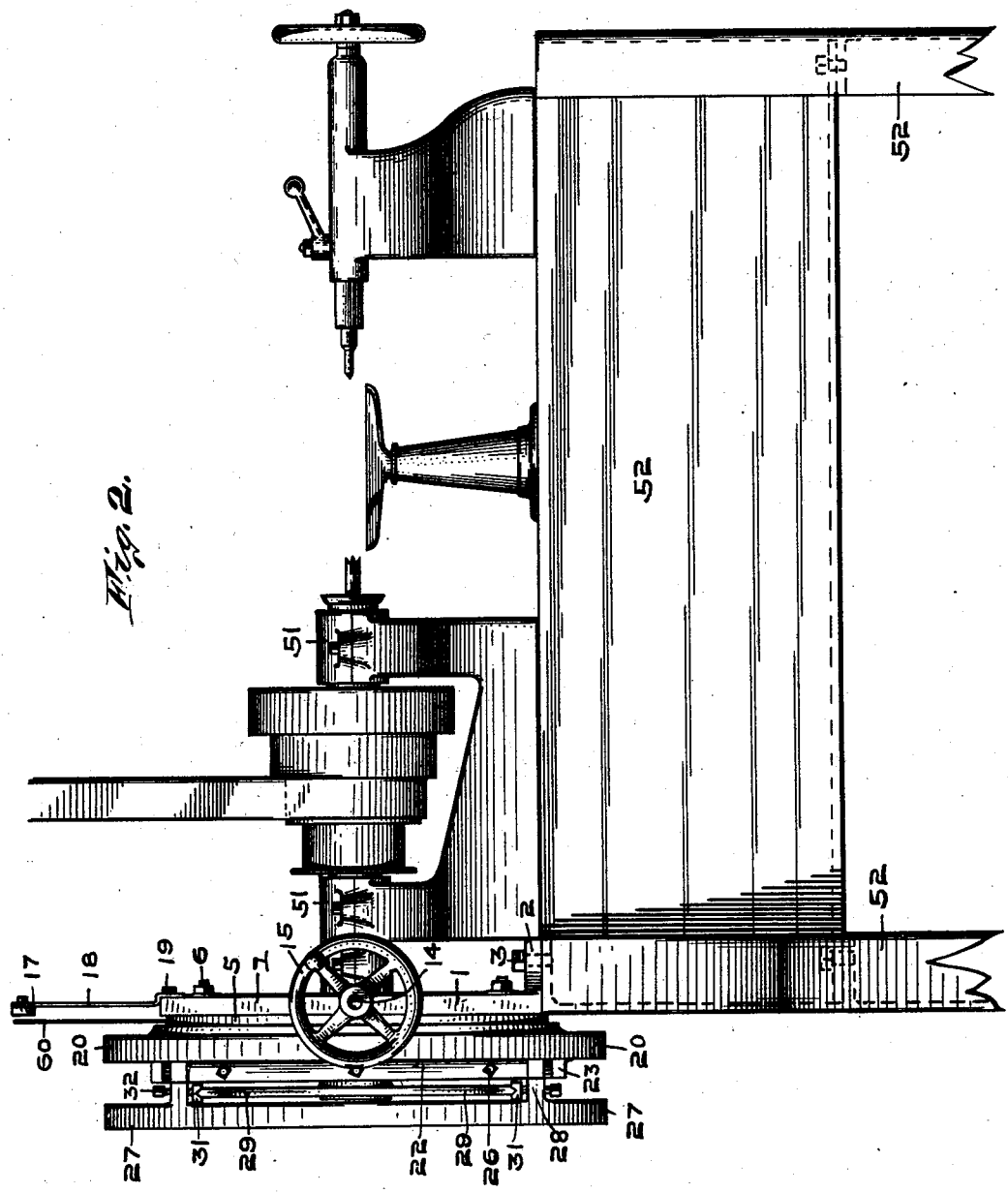
Figure 3:
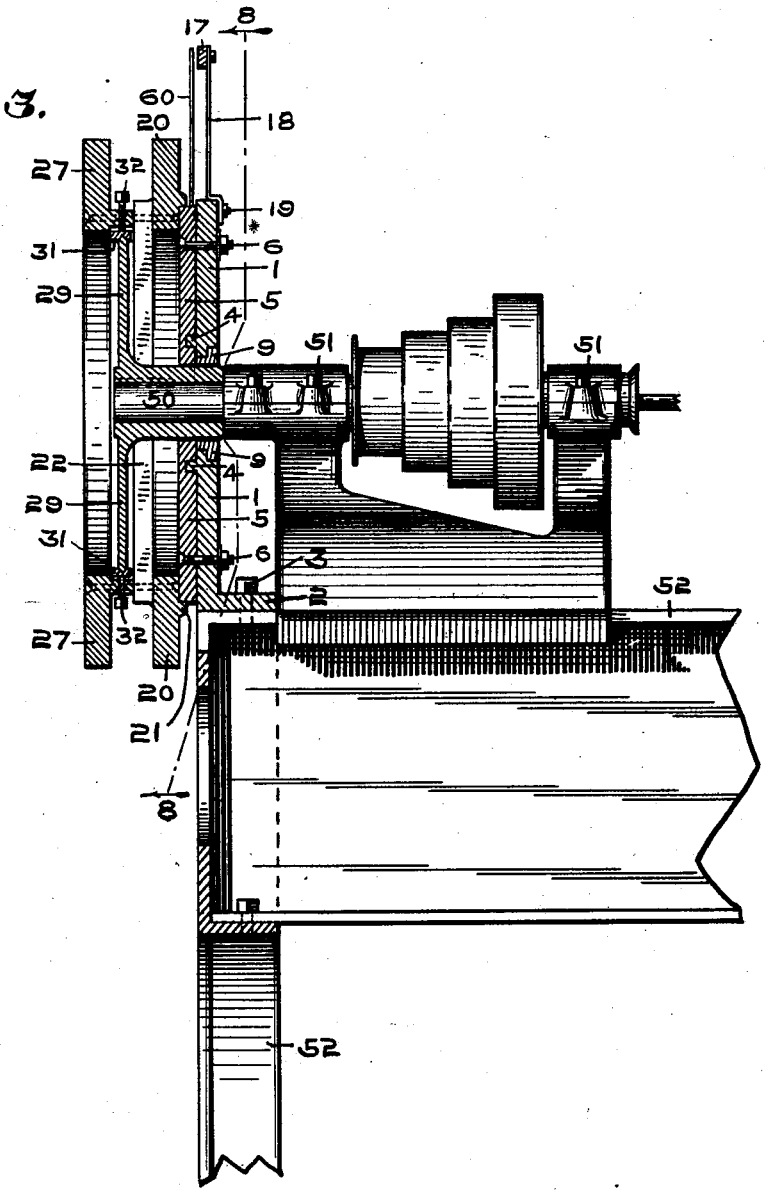

Referring to the accompanying drawings, which are made a part hereof, and on which similar numerals of reference indicate similar parts, Figure 1 is a front elevation of my improved combination-lathe, in which the annular rings are positioned concentric to the main driving-shaft and shows the machine ready to produce circular work. Fig. 2 is a side elevation of the lathe-frame and shows the relative position of my device thereto. Fig. 3 is a central vertical sectional view as seen from the dotted line 3 3 in Fig. 1. Fig. 4 is a front elevation of my device removed from the lathe-frame and shows the parts changed to the first step toward forming an 'ellipsis. This view shows the annular rings drawn to one side on a horizontal plane from the axis of the driving-shaft. Fig. 5 is a front elevation of my device in which the rear ring has been moved or rotated one-eighth of its course of travel, while the front ring has started on its elliptic course. Fig. 6 is a front elevation of my device after having moved six-eighths of the course and at which point the ellipsis has reached its greatest diameter. Fig. 7 is a detail view of the stationary back plate and shows the circular disk secured thereto. Fig. 8 is a rear elevation of my device and shows my stationary back plate and the horizontal slot therein, which slot forms a guide for the sliding annular rings, as seen from the dotted line 8 8 in Fig. 3. Fig. 9 is a horizontal cross-sectional view as seen from the dotted line 9 9 in Fig. 8. Fig. 10 is an enlarged edge view of my device, in which a portion thereof is shown in elevation and a portion in section. This view shows the means for connecting the inner and outer annular rings together as seen from the dotted line 10 10 in Fig. 11; and Fig. 11 is a partial vertical section of the driving-plate and a part in section of the slides and guides which adjustably secures the rings together, as seen from the dotted line 11 11 in Fig. 10.

In the drawings 1 is the main stationary plate which forms the support for the rings and carries the integral right-angle flange 2, which rests on the lathe-frame. The plate 1 is secured to the lathe-frame by means of the bolts 3, which pass through the integral flange 2.

I have shown in the drawings a simple and effective mode for securing the back plate to the lathe-frame. I have no desire, however, to limit myself to this exact construction. The back plate 1 could be made entirely free from the lathe-frame, in which instance it would be provided with self-supporting legs.

The plate 1 has a horizontal slot therein. The edges form a guide for the sliding plate 9, carrying the disk 5, and will be hereinafter described. The plate 1 is also provided with the horizontal extending ribs 4 on the front surface. The ribs 4 mesh with corresponding grooves in the disk and prevent said wheel from rotating. However, they form a guide for the wheel which has horizontal movement.

A disk 5 is adjustably secured to the back plate 1 by means of the sliding plate 9 and bolts 10. When the disk 5 is moved horizontally until the radius of the desired ellipsis is procured, it is rigidly secured to the back plate 1 by means of the bolts 6 and the slots 7. The disk 5 is also provided with a horizontal slot 8, that provides both a passage-way for the main driving-shaft and withal allows the disk 5 horizontal movement. The slot 8 extends parallel with the slot in the back plate 1. A plate 9 engages with the horizontal slot in the back plate 1 and slides horizontally therein. The sliding plate 9 is rigidly secured to the disk 5 by means of the bolts 10. The sliding plate 9 is provided with the slot 11, that registers with the slot 8 in the disk 5. The two slots have a similar purpose. The sliding plate 9 has a cross-strip 12, secured thereto by means of the bolts 13. The plate 12 serves in forming a seat for the screw-shaft 14, that carries an annular groove near the end that engages with a corresponding rib in the strip 12 and the plate 9. The screw-shaft 14 passes through suitable bearings in the back-plate 1 and is provided with the hand-wheels 15 and 16. The wheel 15 serves to move the shaft, while the wheel 16 acts as a jam-nut for securing the shaft when the same is adjusted. The shaft 14 provides the means for moving the disk 5 horizontally to and from the axis of the main shaft, and thereby changing the relative centers of the two. The distance between the axis of the shaft and the disk 5 equals the radius of the ellipses.

To enable me in determining and measuring the diameter of the various ellipses procurable on my device, I mount the horizontal bar 17, carrying the graduating-scale thereon, to the back plate 1 by mean of the standards 18 and the bolts 19. The disk 5 carrying an indicator-hand 60, that extends across the face of the graduating-scale on the bar 17, enables me to accurately record the amount of lateral movement given the disk 5, which distance is the radius of the ellipse. The periphery of the disk 5 forms a guide for the ring 20. The ring 20 is annular in form and carries the rib 21 on the rear surface. The rib 21 conforms to and overlaps the periphery of the disk 5. It will be seen that seating the disk 5 into the recess in the ring 20 permits the disk to carry the rings 20 and 27 when it is moved horizontally. The front surface of the ring 20 is provided with the ribs 22 and 23, that form guides and are preferably made integral with the ring. The inner ribs 22, which are nearest the axis of the ring, carry a V-shaped groove in the edges adjacent to the ribs 23 and form a guide for the slides 24. The slides 24 have their inner edges cut to conform and engage with the V-shaped grooves in the ribs 22. The plates 25 are inserted between the outer ribs 23 and the slides 24 and provide a means for taking up lost motion. The plates 25 are held against the slides 24 and are subject to adjustment by the screw-bolts 26, that pass through the outer ribs 23 and bear against said plates 25. The slides 24 are rigidly secured to the outer ring 27 by means of the bolts 40 and slide between the ribs 22 and the plates 25, thus allowing the "chuck-head" or outer ring 27 to conform to the amount of eccentricity. It will be readily understood that this adjustment becomes necessary, else the ring 27 would follow a true circle in its rotation. It will be seen that the slides 24 are not secured to the rear surface of the ring 27, but to the ribs 28, which are integral with said ring. The ribs 28 stand at right angle to the slides 24, and the object therefor will be hereinafter described.

A main driving-shaft 50 is suitably mounted in bearings 51 in the lathe-frame 52 and projects through the horizontal slot in the stationary back plate 1, the disk 5, and the annular ring 20. The main shaft carries the driving-plate 29, that is rigidly secured thereto. The driving-plate 29 has the two opposite edges cut on an inclination or beveled. These V-shaped edges engage with plates 31. The plates 31 are interposed between the edges of the driving-plate 29 and the ribs 28 on the ring 27. The plates 31 take up lost motion and are held in position by the screw-bolts 32, that pass through the ribs 28. When the beveled edges of the driving-plate 29 are standing in a horizontal position, it enables me to move the disk 5, rings 20 and 27 in a horizontal direction. (See Figs. 1 and 11.)

I have already described the various parts of the lathe, the rings, and the various positions they assume thereon. I will, however, briefly recapitulate the combination-lathe as a whole. The stationary back 1 may be secured to the lathe-frame by the bolts 3 and occupies the position shown in Fig. 1. A disk 5, provided with a slot, is adjustably secured to the back 1. The disk 5 can be moved laterally on the back 1 by means of the screw-shaft 14 and forms the support and guide for the inner ring 20. The ring 20 is provided with guide-grooves, which receive the slides 24, which are rigidly secured to the transverse ribs 28, formed integrally with the outer ring 27. The outer ring 27, by means of the integral ribs 28, is supported and driven by the driving-plate 29. The main driving-shaft 50 is mounted in suitable bearings in the lathe-frame and extends through the back 1, disk 5, and ring 20, and carries the driving-plate 29, which imparts rotary movement to the rings 20 and 27. When the straight edges of the driving-plate 29 stand horizontally, the disk 5, carrying the rings 20 and 27, may be moved in a horizontal direction to and from the shaft 50 by means of the screw-shaft 14. This horizontal movement of the rings determine the radius of the ellipsis.

Having thus fully described my said invention, what I desire to secure by Letters Patent is—

1. In a lathe of the variety shown, a stationary back provided with a slot, a disk provided with a slot that registers with the slot in the back and is adjustably secured to the back, a plurality of rotating members slidably secured together which engage with and are guided by the disk, a driving-shaft passing through the back, disk and inner rotating member, means rigidly secured to the shaft which slidably engages with the outer rotating member, and means engaging with the back and disk and adapted to shift said disk and rotating members to and from the shaft.

2. In a lathe of the variety shown, a stationary back provided with a slot, a disk provided with a slot that registers with the slot in the back and adjustably secured to said back, a plurality of rotating rings slidably secured together which ride on and are guided by the disk, means engaging with the back and disk for moving the latter on the former, a driving-shaft extending through the slots in the back and disk, means on the shaft which slidably engages with the outer ring as and for the purposes set forth.

3. In a lathe of the variety shown, a stationary back, a disk adjustably secured to the back, a plurality of rotating members slidably secured together of which one engages with and is guided by said disk, a driving-shaft, a driving-plate on the shaft which slidably engages with the outer rotating member and adapted to impart rotary movement to the members, means engaging with the stationary back and disk for moving the latter on the former, a graduating-scale secured to the stationary back, an indicator-arm secured to the disk and extending across the face of the scale and adapted to record the amount of lateral movement of the disk.

In witness whereof I have hereunto set my hand and seal, at Indianapolis, Indiana, this 4th day of March, A. D. 1903.

JOHN B. EHRLICH. [L. S.]

Witnesses:
C. C. TOPP,
F. W. WOERNER.